(12) United States Patent
Muia-Longman (10) Patent No.: US 7,303,035 B2
(45) Date of Patent: Dec. 4, 2007

(54) HOOD ASSEMBLY METHOD AND APPARATUS

(75) Inventor: Gina Muia-Longman, Seattle, WA (US)

(73) Assignee: PACCAR Inc, Bellevue, WA (US)

( * ) Notice: Subject to any disclaimer, the term of this patent is extended or adjusted under 35 U.S.C. 154(b) by 297 days.

(21) Appl. No.: 10/878,710

(22) Filed: Jun. 28, 2004

(65) Prior Publication Data

US 2005/0284678 A1   Dec. 29, 2005

(51) Int. Cl.
B62D 25/12   (2006.01)

(52) U.S. Cl. .................................. 180/69.21

(58) Field of Classification Search ............... 180/69.2, 180/69.21, 69.24, 89.17; 296/193.11, 26.07; 16/317, 324, 325
See application file for complete search history.

(56) References Cited

U.S. PATENT DOCUMENTS

| 179,424 | A | | 7/1876 | Pfeifer |
|---|---|---|---|---|
| 1,187,040 | A | | 6/1916 | Capps |
| 1,225,322 | A | | 5/1917 | Forth |
| 1,580,289 | A | | 4/1926 | Cummings |
| 1,942,665 | A | | 1/1934 | Schmitt |
| 2,135,613 | A | * | 11/1938 | De Orlow ................ 217/60 B |
| 2,903,149 | A | | 9/1959 | Turner |
| 3,183,927 | A | | 5/1965 | Weese et al. |
| 3,225,857 | A | * | 12/1965 | De Haan et al. ......... 180/69.21 |
| 3,556,240 | A | | 1/1971 | Hartman |
| 3,941,415 | A | | 3/1976 | Cooper |
| 4,359,119 | A | | 11/1982 | Kammerman |
| 4,915,441 | A | | 4/1990 | Nitzke |
| 5,022,118 | A | | 6/1991 | Wan-Li |
| 5,730,240 | A | * | 3/1998 | Hoffman et al. ......... 180/69.21 |
| 5,791,428 | A | | 8/1998 | Noll et al. |
| 5,975,228 | A | | 11/1999 | Parfitt |
| 6,003,204 | A | | 12/1999 | Roach et al. |
| 6,394,211 | B1 | | 5/2002 | Palenchar et al. |
| 6,637,531 | B2 | | 10/2003 | Palenchar et al. |
| 6,892,843 | B2 | * | 5/2005 | Schillaci et al. ......... 180/69.21 |
| 2002/0000022 | A1 | * | 1/2002 | Schillaci et al. ............. 16/319 |
| 2003/0183434 | A1 | * | 10/2003 | Schillaci et al. ......... 180/69.21 |

FOREIGN PATENT DOCUMENTS

DE   198 04 945 A1 *  8/1999
JP   8-270287    * 10/1996

* cited by examiner

Primary Examiner—Frank Vanaman
(74) Attorney, Agent, or Firm—Christensen O'Connor Johnson Kindness PLLC (57) ABSTRACT

A hood assembly 100 for a vehicle 104 is disclosed. The hood assembly includes a hood 102 coupled to the vehicle and movable between an open position and a closed position. The hood assembly also includes a locking assembly 106. The locking assembly has a locked position for selectively locking the hood in the open position and a release position for permitting the hood to move from the open position to the closed position. The hood assembly further includes a release assembly 110 coupled to the locking assembly for actuating the locking assembly between the locked position and the release position, wherein the release assembly is actuatable by a user 105 standing in front of the hood.

24 Claims, 8 Drawing Sheets

HOOD ASSEMBLY METHOD AND APPARATUS

FIELD OF THE INVENTION

The present invention relates generally to hood assembly methods and apparatuses, and more particularly to hood assembly methods and apparatuses for locking and unlocking a hood of a vehicle in an open position.

BACKGROUND OF THE INVENTION

Class Eight trucks typically have a hood assembly including a hood which is pivotally coupled to the frame of the truck, typically near the lower front edge of the hood. A pair of locking assemblies located at the sides of the hood permit the hood to be locked in an open position once the hood is opened to impede unintentional closings and injuries. The locking assemblies used with Class Eight trucks are therefore very different from the locking assemblies associated with a typical passenger car hood assembly, which has a locking assembly for locking the hood in the closed position, not the open position.

Previously developed hood assemblies require the user to walk to the side of the truck to disengage the locking assemblies before walking to the front of the hood to push the hood closed. Thus, the locking assemblies are in an unlocked position while the user walks to the front of the hood. During this period, the hood may be unintentionally closed, such as by a wind gust, causing injury to the user. Further, the closing process is cumbersome as the user has to first walk to the side or sides of the hood to unlock the locking assemblies and then back to the front of the hood to rotate the hood to the closed position. Thus, there exists a need for a hood assembly that offers increased safety for the user and is less cumbersome to operate.

SUMMARY OF THE INVENTION

One embodiment formed in accordance with the present invention of a hood assembly for a vehicle is disclosed. The hood assembly includes a hood coupled to the vehicle and movable between an open position and a closed position. The hood assembly further includes a locking assembly having a locked position for selectively locking the hood in the open position and a release position for permitting the hood to move from the open position to the closed position. The hood assembly further yet includes a release assembly coupled to the locking assembly for actuating the locking assembly between the locked position and the release position. The release assembly is actuatable by a user standing in front of the hood.

Another embodiment formed in accordance with the present invention of a hood assembly for a vehicle is disclosed. The hood assembly includes a hood coupled to the vehicle and movable between an open position and a closed position. The hood assembly further includes a pair of locking assemblies coupled to opposite sides of the hood. Each of the locking assemblies has a locked position for locking the hood in the open position and a release position for permitting the hood to move to the closed position. The hood assembly further yet includes a release assembly coupled to each of the locking assemblies for configuring each of the locking assemblies substantially simultaneously between the locked position and the release position. The release assembly is actuatable by a user located remotely of the locking assemblies.

An alternate embodiment formed in accordance with the present invention of a hood assembly is disclosed. The hood assembly includes a hood coupled to the vehicle and movable between an open position and a closed position. The hood assembly further includes a locking assembly having a locked configuration for locking the hood in the open position and a release configuration for unlocking the hood so that the hood may be moved from the open position to the closed position. The locking assembly includes a cam, wherein rotation of the cam results in the locking assembly being configured between the locked and release configurations.

Another alternate embodiment formed in accordance with the present invention of a hood assembly for a vehicle is disclosed. The hood assembly includes a hood coupled to the vehicle and movable between an open position and a closed position, the hood having a front portion and a pair of sides extending aft of the front portion. The hood assembly further includes a locking assembly coupled to at least one of the pair of sides. The locking assembly has a locked configuration in which the locking assembly impedes the hood from moving from the open position to the closed position and an unlocked configuration in which the locking assembly permits the hood to move from the open position to the closed position. The hood assembly further yet includes a release assembly extending between the front portion of the hood and the locking assembly. The release assembly is actuatable by a user standing in front of the front portion of the hood to remotely transition the locking assembly from the locked configuration to the unlocked configuration.

Still another alternate embodiment formed in accordance with the present invention of an apparatus for interfacing with a hood of a vehicle, the hood movable between an open position and a closed position, is disclosed. The apparatus includes a locking assembly having a locked position for selectively locking a hood in an open position and a release position for permitting the hood to move from the open position to a closed position. The apparatus further includes a release assembly coupled to the locking assembly for actuating the locking assembly between the locked position and the release position, wherein the release assembly is actuatable by a user standing in front of the hood.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
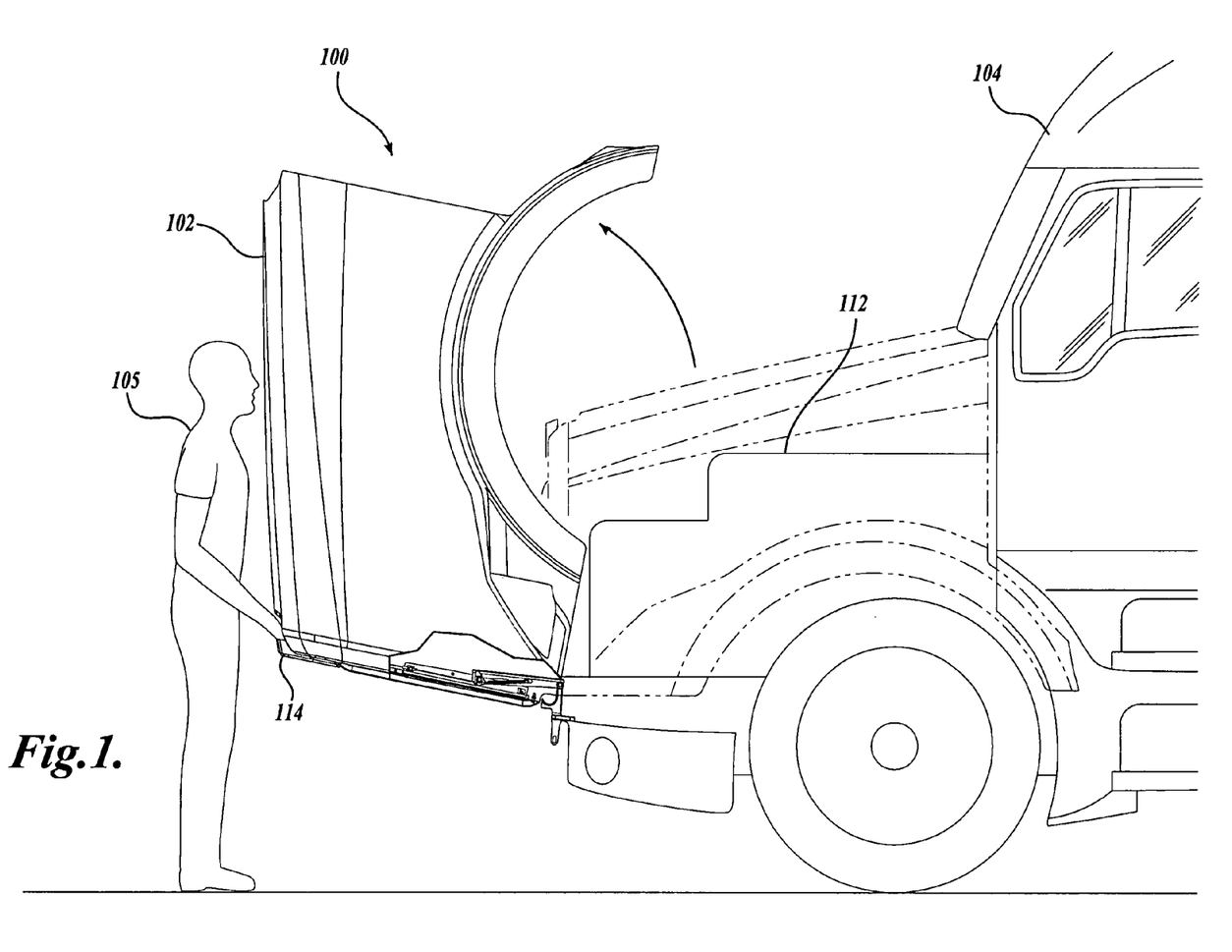
FIG. 1 is an elevation view of one embodiment of a hood assembly formed in accordance with the present invention, wherein a user is actuating a release assembly to permit a hood to rotate rearward from an open position shown in solid lines to a closed position shown in phantom lines, and wherein a portion of the hood has been cut away to depict a locking assembly.
Figure 2:
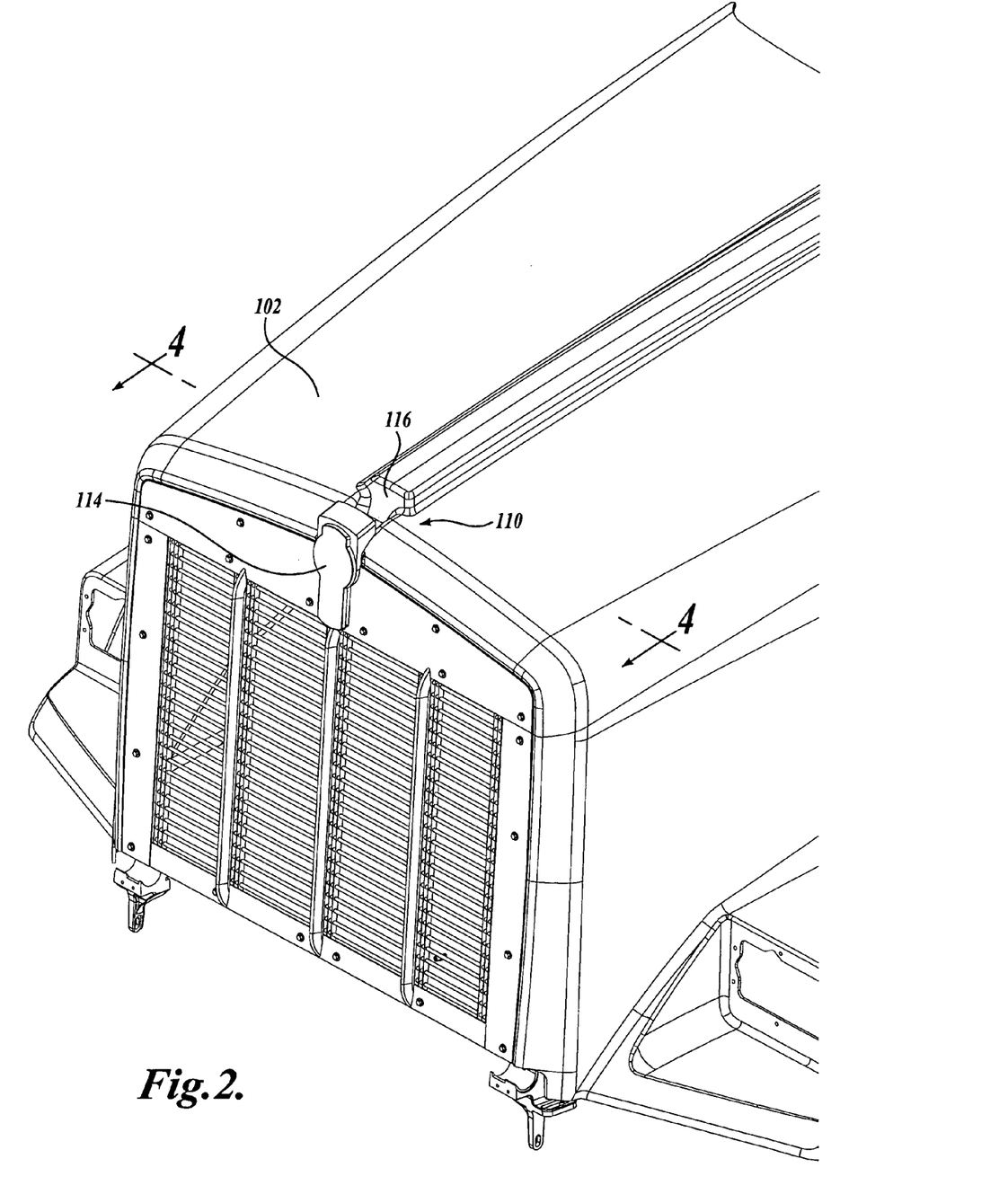
FIG. 2 is a front perspective view of the hood assembly of FIG. 1.
Figure 3:
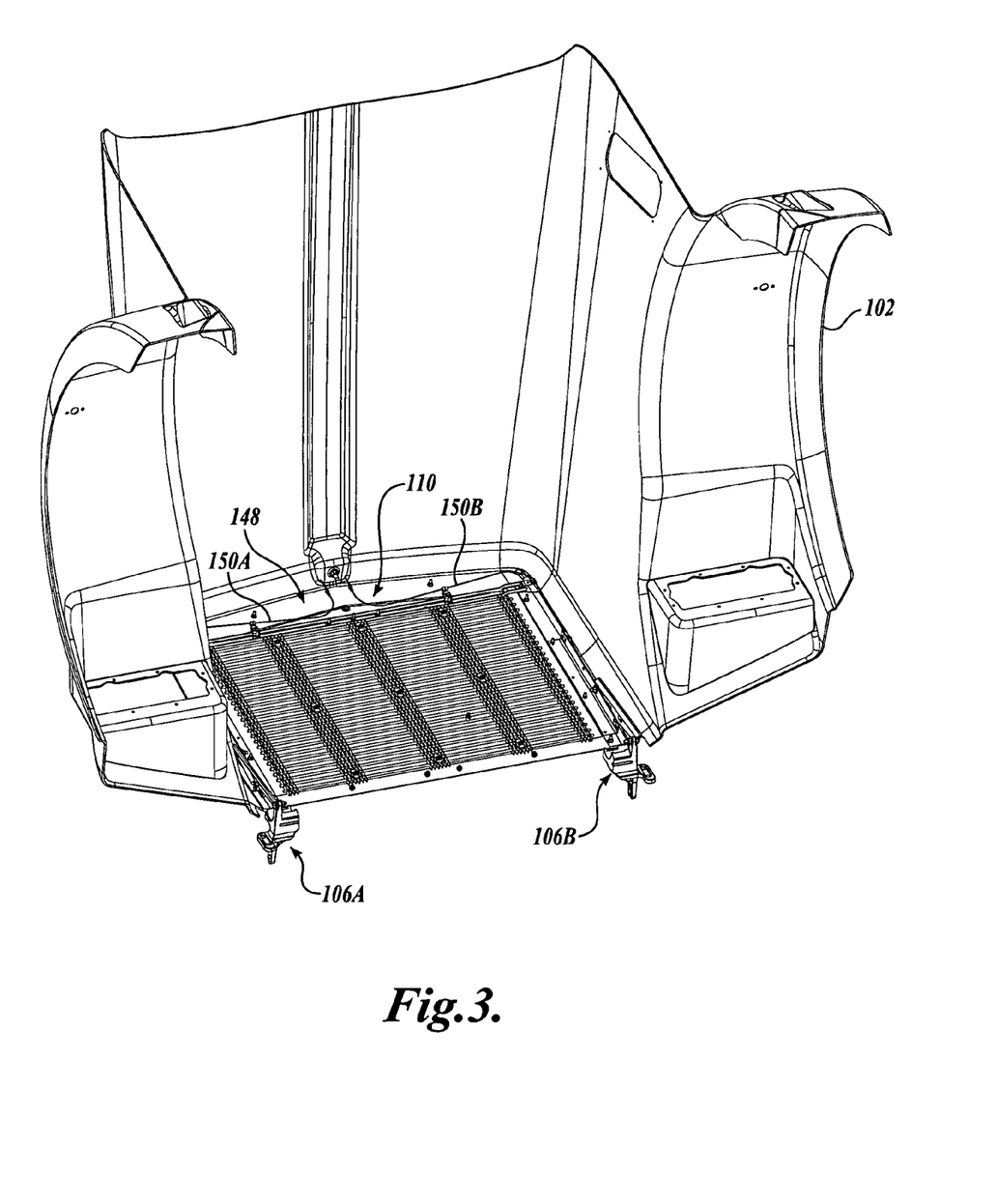
FIG. 3 is a perspective view of the hood assembly of FIG. 1 depicting the inside of the hood with the hood in the open position.
Figure 4:
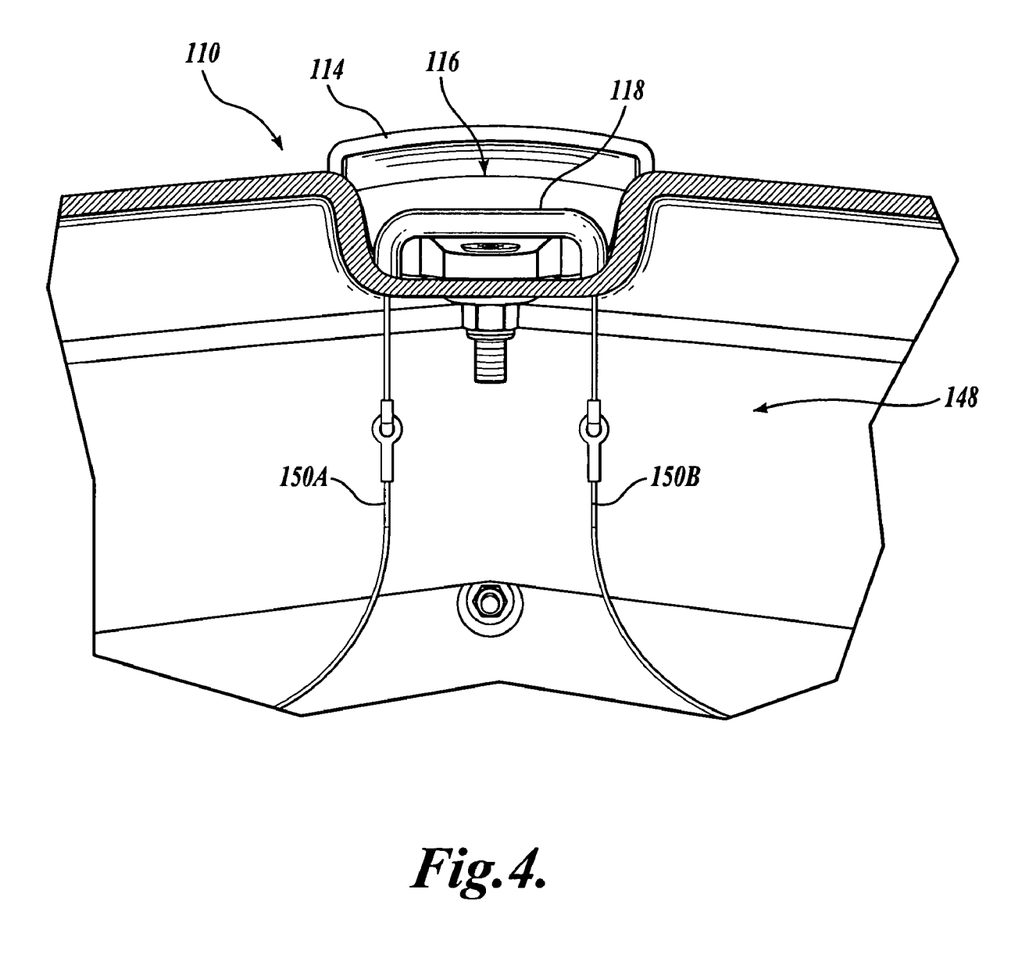
FIG. 4 is a cross-sectional view of the hood assembly of FIG. 1 showing an actuator disposed behind a hood emblem, the actuator actuatable by a user to unlock the hood from the open position, the cross-sectional cut taken through section 4-4 of FIG. 1.

One embodiment of a hood assembly 100 formed in accordance with the present invention is depicted in FIGS. 1-8. Referring to FIG. 1, generally stated, the hood assembly 100 permits a hood 102 of the vehicle 104 to be locked and unlocked to permit the hood to be transitioned from an open position shown in solid lines to a closed position shown in phantom lines. The hood assembly 100 also permits a user 105 to both unlock the hood 102 from the open position and close the hood 102 without leaving a position in front of the hood 102. Moreover, the hood assembly 100 permits a pair of hood locking assemblies 106A and 106B (best shown in FIG. 3) to be configured from a locked position to an unlocked position while the user stands in front of the hood 102, thus permitting a user to close the hood 102 without leaving his or her position in front of the hood 102.

Turning to FIGS. 1-4, and focusing in more detail upon the hood assembly 100, the hood assembly 100 includes the hood 102, the pair of locking assemblies 106A and 106B, and a release assembly 110. The hood 102 forms an enclosure for housing an engine 112 of the vehicle 104. The hood 102 is configurable between an open position permitting access to the engine 112 and a closed position enclosing the engine 112. The open position is shown in solid lines and the closed position is shown in phantom lines in FIG. 1. The hood 102 includes a hood emblem 114 centered along a top forward edge of the hood 102. Disposed directly behind and partly defined by the hood emblem 114 is a recess 116 in the hood 102. The recess 116 houses an actuator (such as a release latch 118) of the release assembly 110 such that the release latch 118 is disposed outside of the hood 102. Pulling the release latch 118 away from the hood 102 results in the locking assemblies 106 being released from the locked position as will be described in more detail below.

Figure 5:
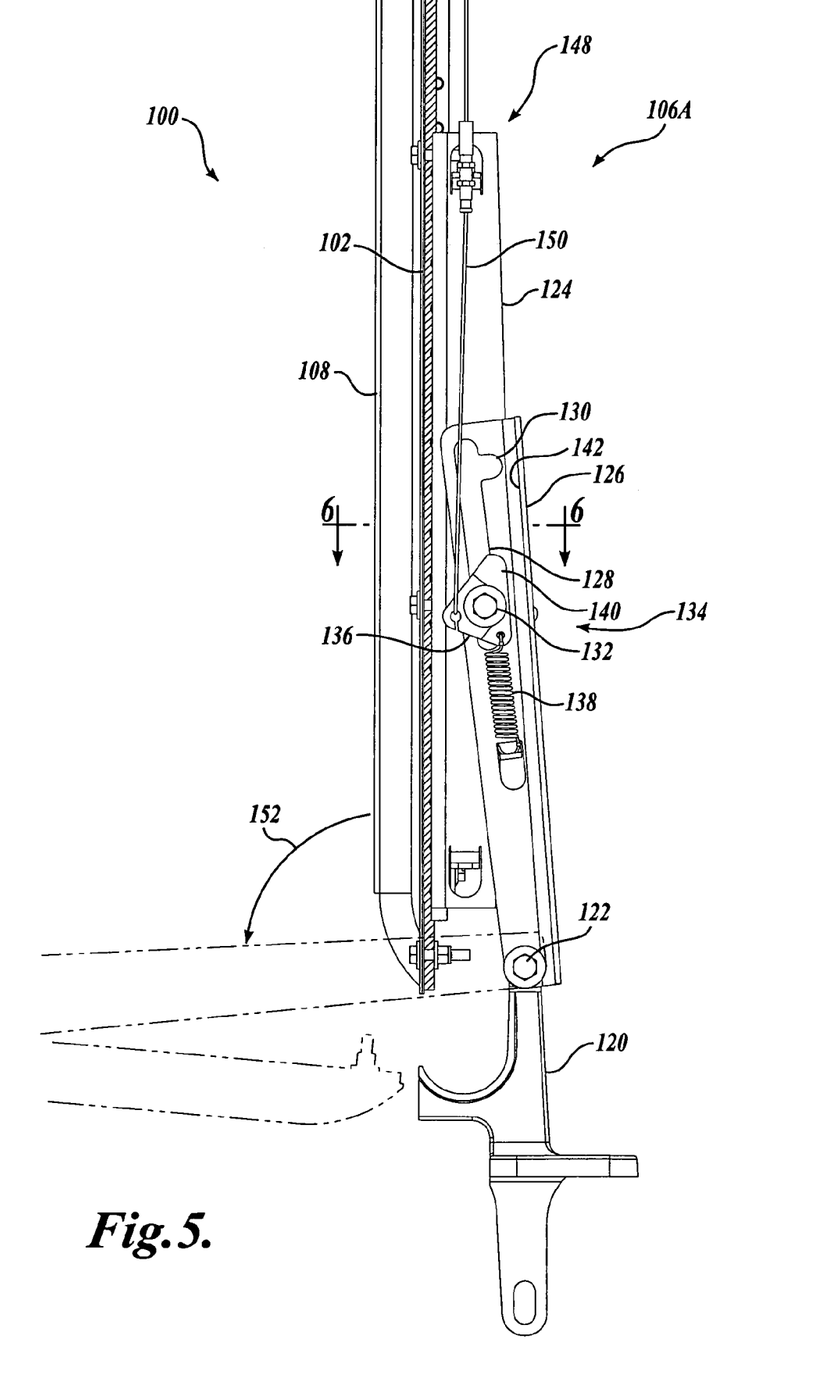
FIG. 5 is an elevation view of a locking assembly of the hood assembly of FIG. 1, the locking assembly shown in an unlocked position with the hood in the closed position.
Figure 6:
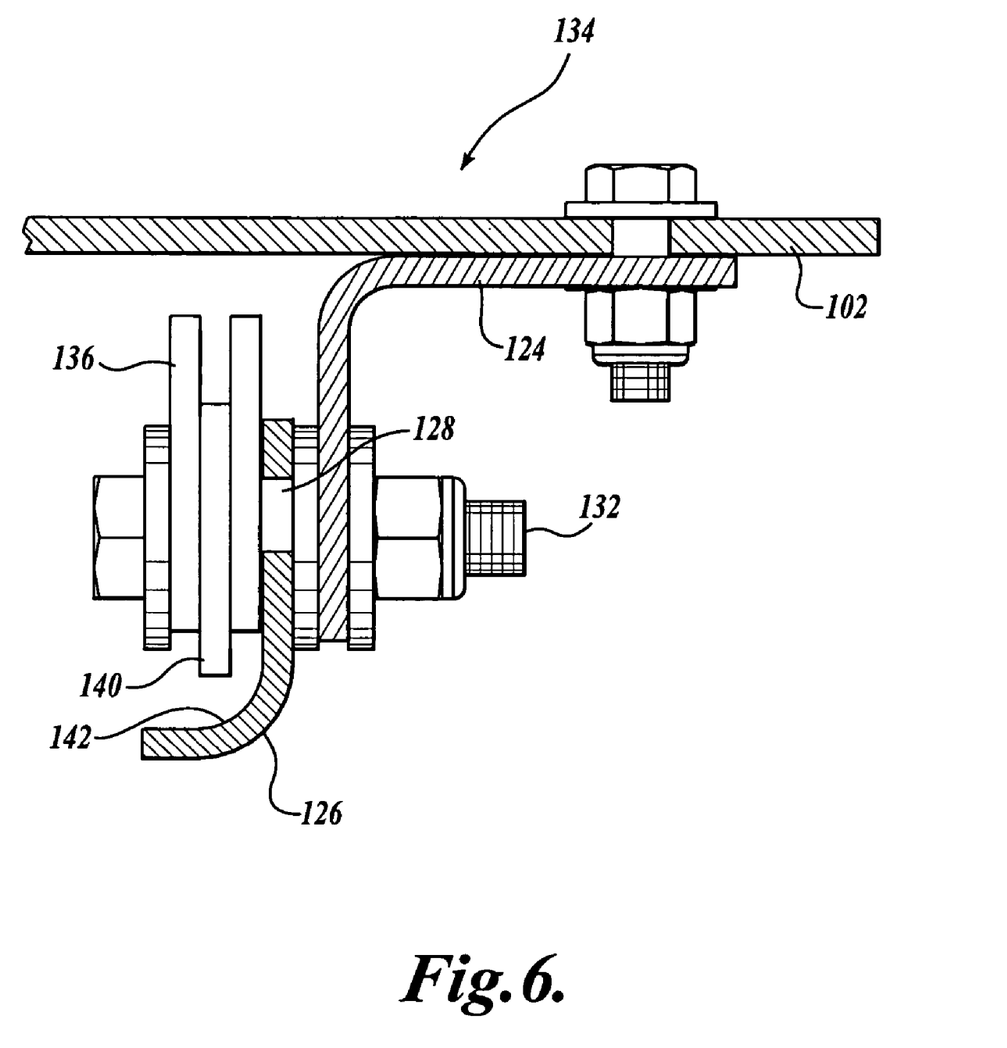
FIG. 6 is a cross sectional view of the locking assembly of FIG. 5, the cross sectional cut taken substantially through section 6-6 of FIG. 5.

Referring to FIGS. 5 and 6 and focusing on the locking assemblies 106, the locking assemblies 106 include a left locking assembly 106A and a right locking assembly 106B, (see FIG. 3) the locking assemblies 106 disposed on opposite sides of the hood 102. Inasmuch as the left and right locking assemblies 106 are mirror images of one another, it will be understood by those skilled in the art that description of one of the locking assemblies 106 relates directly to the other locking assembly. Therefore, for the sake of brevity, only one of the locking assemblies 106A will be described in detail herein. Further, it should be apparent to those skilled in the art, although a pair of locking assemblies are shown and described in the illustrated embodiment, a hood assembly 100 having a single locking assembly or three or more locking assemblies are also within the spirit and scope of the present invention.

The left locking assembly 106A includes a hood mounting member 124 and a locking arm 126. The hood mounting member 124 is generally in the shape of a piece of angle iron and is coupled to the inner surface of a left side of the hood 102 so as to be substantially vertically oriented when the hood 102 is in a closed position.

The locking arm 126 is also generally shaped in the form of a piece of angle iron, is elongate in shape, and includes a longitudinally oriented slot 128. The slot 128 further includes at least one detent 130. The locking assembly 106 is pivotally coupled to the mounting bracket 120 via a pivot 122. The mounting bracket 120 is in turn rigidly coupled to a frame of the vehicle (not shown) and therefore remains stationary during the opening and closing of the hood 102. The locking arm 126 is also pivotally coupled to the hood mounting member 124 via a second pivot 132.

Figure 7:
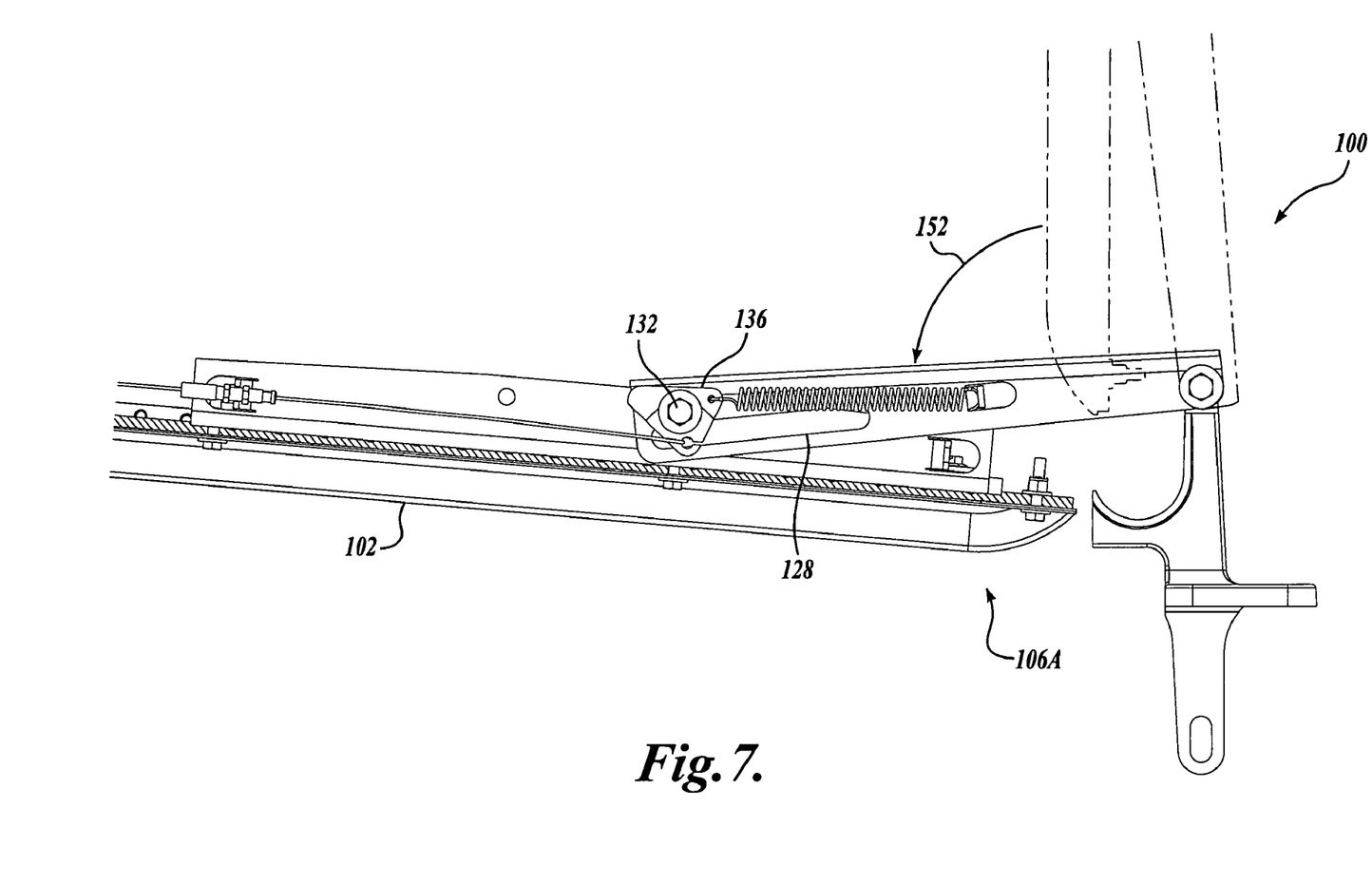
FIG. 7 is an elevation view of the locking assembly of FIG. 5, wherein the locking assembly is shown in the unlocked position with the hood in the open position.

The locking assembly 100 further includes a locking device 134. The locking device 134 selectively locks the locking assembly 106 in a locked configuration to lock the hood 102 in an open position as shown in FIG. 7, as will be described in more detail below. The locking device 134 includes a cam 136, the pivot 132, and a biasing member 138, such as a spring. The cam 136 includes an unlocking lobe 140. The cam 136 is selectively rotatable such that the unlocking lobe 140 engages a cam follower surface 142 of the locking arm 126 resulting in the movement of the cam 136 outward from the cam follower surface 142.

The pivot 132 of the locking device 134 serves multiple purposes. As described above, the pivot 132 pivotally couples the locking arm 126 to the hood mounting member 124. Further, the pivot 132 pivotally couples the cam 136 to the locking arm 126. Further still, the pivot 132 acts a pawl for selective engagement with the detent 130 of the slot 128 to lock the hood 102 in the open position, as will be described in more detail below. The biasing member 138 is coupled to the cam 136 and biases the cam 136 to disengage the unlocking lobe 140 from the cam follower surface 142, when the actuator 118 (See FIG. 4) is released.

Turning to FIGS. 2-5, the hood assembly 100 further includes the release assembly 110. The release assembly 110 includes the release latch 118, and a cable assembly 148. The release latch 118 is located at the midpoint of the top front edge of the hood 102 behind the emblem 114 as discussed above. The cable assembly 148 includes a pair of flexible lines, such as cables 150A and 150B, which direct a force applied to the release latch 118 to the locking devices 134. More specifically, the cables 150 are routed from the release latch 118 to the cams 136. Movement of the cables 150 (caused by movement of the release latch 118), causes the cams 136 to rotate such that the unlocking lobes 140 engage the cam follower surface 142 resulting in the unlocking of the locking assemblies 106.

The routing of the cables 150 may be done in any manner as should be apparent to those skilled in the art. Also, although the illustrated embodiment depicts the use of a pair of cables 150, a single cable may be used which is linked to both of the cams 136, wherein the release latch 118 is linked to the cable such that movement of the release latch 118 causes the cable to be tensioned or released accordingly.

In light of the above description of the structure of the hood assembly 100, the operation of the hood assembly 100 will now be described. Referring to FIG. 5, the hood 102 is shown in the closed position. The pivot 132 associated with the cam 136 is disposed in the slot 128 of the locking arm 126 near the end of the slot 128 disposed away from the detent 130. The biasing member 138 is relatively loose, applying little to no biasing force upon the cam 136. The cable 150 is in a non-tensioned state. The grill or front surface 108 of the hood 102 is substantially vertical.

The user then unlatches (the latches are not shown for clarity) the hood and rotates the hood 102 forward in the direction of arrow 152 to the open position shown in phantom lines wherein the grill or front surface 108 of the hood 102 is substantially horizontal. Of note, although not shown for clarity, a torsion bar and pivot assembly is used to support and counterbalance the hood 102 as the hood 102 is transitioned between the open and closed positions.

Turning to FIG. 7, the hood 102 is shown in the open position with the locking assembly 106 shown in the locked position. As the hood 102 is rotated into the open position, the pivot 132 slides along slot 128 and enters the detent 130 (best shown in FIG. 5) under the force of gravity and as assisted by the biasing member 138, placing the locking assembly 106A in the locked position. Any forces tending to move the hood 102 back to the closed position, such as may be caused by a gust of wind, are prevented by the engagement of the pivot 132 with the detent.

Figure 8:
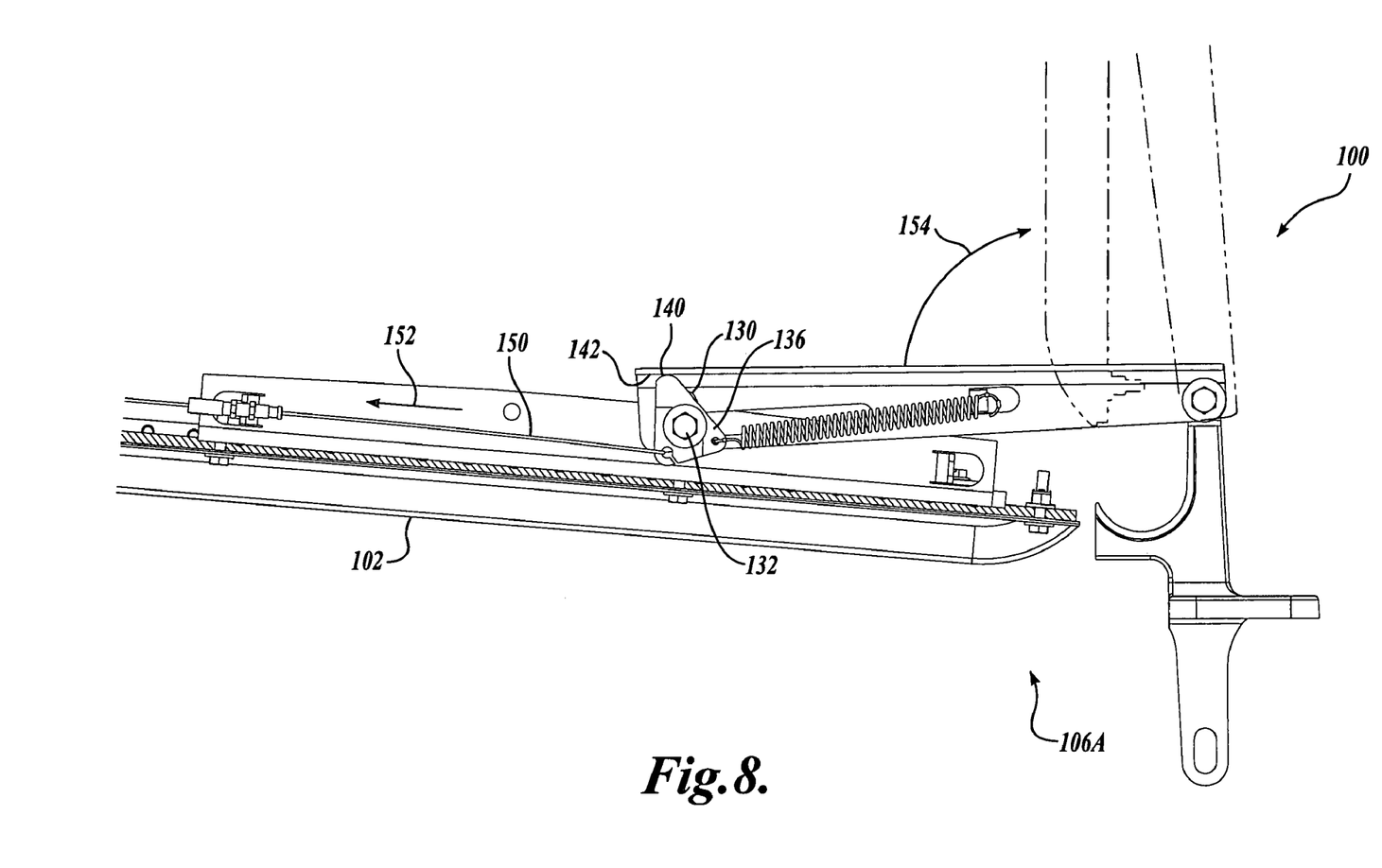
FIG. 8 is an elevation view of the locking assembly of FIG. 5, wherein the locking assembly is shown in a locked position with the hood in the open position.

Turning to FIG. 8, the hood 102 is shown in the open position with the locking assembly 106 shown in the unlocked position. In the unlocked position, the cable 150 has been tensioned by a user pulling on the release latch while the user is disposed in front of the hood 102, such as shown in FIG. 1. Tensioning and movement of the cable 150 in the direction of arrow 152 through movement of the release latch 118 (best shown in FIG. 4) causes the cam 136 to rotate such that the unlocking lobe 140 engages the cam follower surface 142. Engagement of the unlocking lobe 140 with the cam follower surface 142 causes the cam 136 and associated pivot 132 to move outward from the cam follower surface 142. Movement of the cam 136 and pivot 132 in this manner causes the cam 136 and the pivot 132 to move outward from the detent 130 (i.e. from a locking position) and back into the slot 128 (i.e. into a release or unlocked position). Thus, when a user applies a closing force upon the hood 102, the pivot 132 is free to slide along the slot 128 and the hood 102 is free to rotate in the direction of arrow 154 to the closed position. Once the user releases the release latch from its release position, the biasing member pulls the cable 150 in the direction opposite arrow 152 to place the release latch back into its unlocked position.

Although the illustrated and described embodiment of the hood assembly depicts a specific locking assembly having a specific locking device, it should be apparent to those skilled in the art that the illustrated locking assembly and locking device are illustrative in nature and that any number of previously and yet to be developed locking assemblies and locking devices are suitable for use with and are within the spirit and scope of the present invention, a few suitable examples being an over center type locking assembly and/or latch locking assemblies such as shown in U.S. Pat. Nos. 4,359,119, 4,915,441, 5,791,428, 5,975,228, 6,394,211, and 6,637,531, the disclosures of which are hereby expressly incorporated by reference.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A hood assembly for a vehicle comprising:
   (a) a hood coupled to the vehicle and movable between an open position and a closed position;
   (b) a locking assembly having a locked position for selectively locking the hood in the open position and a release position for permitting the hood to move from the open position to the closed position; and
   (c) a release assembly coupled to the locking assembly for actuating the locking assembly between the locked position and the release position, wherein the release assembly is actuatable by a user standing in front of the hood;
   wherein the locking assembly includes a cam follower, a cam having a lobe that engages the cam follower, and a slot having at least one detent, and wherein the cam includes a pawl slideable along the slot and moveable into the detent to configure the locking assembly in the locked position.

2. The hood assembly of claim 1, wherein the release assembly includes an actuator actuatable by the user to a release configuration for configuring the locking assembly in the release position, and wherein the actuator is disposed on a front portion of the hood so as to be accessible to the user standing in front of the hood.

3. The hood assembly of claim 1, wherein the release assembly includes an actuator actuatable by the user to a release configuration for configuring the locking assembly in the release position wherein the actuator is located remotely from the locking assembly.

4. The hood assembly of claim 3, wherein the actuator is coupled to the locking assembly by a flexible line.

5. The hood assembly of claim 3, wherein the hood includes a recess located adjacent a top front edge of the hood, wherein the actuator is disposed within the recess.

6. The hood assembly of claim 5, wherein the hood includes a hood emblem, wherein the recess is located behind and at least partially defined by the hood emblem.

7. The hood assembly of claim 1, wherein rotation of the cam results in the pawl moving out of the detent to configure the locking assembly in the released position.

8. A hood assembly for a vehicle comprising:
   (a) a hood coupled to the vehicle and movable between an open position and a closed position;
   (b) a pair of locking assemblies coupled to opposite sides of the hood, wherein each of the locking assemblies has a locked position for locking the hood in the open position and a release position for permitting the hood to move to the closed position; and
   (c) a release assembly coupled to each of the locking assemblies for configuring each of the locking assemblies substantially simultaneously between the locked position and the release position, wherein the release assembly is actuatable by a user located remotely of the locking assemblies;
   wherein the locking assemblies each include a cam follower, a cam having a lobe that engages the cam follower, and a slot having at least one detent, and wherein the cam includes a pawl slideable along the slot and moveable into the detent to configure the locking assemblies in the locked position.

9. The hood assembly of claim 8, wherein the locking assemblies each include a locking device having a locked configuration for selectively locking the locking assembly in the open position and a release configuration for permitting the locking assembly to transition to the release position.

10. The hood assembly of claim 9, wherein the release assembly includes an actuator actuatable by the user to configure each of the locking devices in the release position, and wherein the actuator is disposed on a front portion of the hood so as to be accessible to the user while standing in front of the hood.

11. The hood assembly of claim 9, wherein the release assembly includes an actuator actuatable by the user to configure each of the locking devices in the release position, and wherein the actuator is located remotely from the locking devices.

12. The hood assembly of claim 11, wherein the actuator is coupled to each of the locking devices by a flexible line.

13. The hood assembly of claim 11, wherein the hood includes a recess located adjacent a top front edge of the hood, wherein the actuator is disposed within the recess.

14. The hood assembly of claim 13, wherein the hood includes a hood emblem, wherein the recess is located behind and partially defined by the hood emblem.

15. The hood assembly of claim 8, wherein rotation of the cam results in the pawl moving out of the detent to configure the locking assemblies in the released position.

16. A hood assembly for a vehicle comprising:
  (a) a hood coupled to the vehicle and movable between an open position and a closed position; and
  (b) a locking assembly having a locked configuration for locking the hood in the open position and a release configuration for unlocking the hood so that the hood may be moved from the open position to the closed position, wherein the locking assembly includes a cam follower and a cam having a lobe that engages the cam follower, wherein rotation of the cam results in the locking assembly being configured between the locked and release configurations;
  wherein the locking assembly includes a slot having at least one detent, and wherein the cam includes a pawl, and wherein the pawl is slidable along the slot and moveable into the detent to configure the locking assembly in the locked configuration.

17. The hood assembly of claim 16, wherein rotation of the cam results in the pawl moving out of the detent to configure the locking assembly in the release configuration.

18. An apparatus for interfacing with a hood of a vehicle, the hood movable between an open position and a closed position, the apparatus comprising:
  (a) a locking assembly having a locked position for selectively locking a hood in an open position and a release position for permitting the hood to move from the open position to a closed position; and
  (b) a release assembly coupled to the locking assembly for actuating the locking assembly between the locked position and the release position, wherein the release assembly is actuatable by a user standing in front of the hood;
  wherein the locking assembly includes a cam follower, a cam having a lobe that engages the cam follower, and a slot having at least one detent, and wherein the cam includes a pawl slideable along the slot and moveable into the detent to configure the locking device in the locked position.

19. The apparatus of claim 18, wherein the release assembly includes an actuator actuatable by the user to a release configuration for configuring the locking assembly in the release position, and wherein the actuator is adapted to be disposed on a front portion of the hood so as to be accessible to the user standing in front of the hood.

20. The apparatus of claim 18, wherein the release assembly includes an actuator actuatable by the user to a release configuration for configuring the locking assembly in the release position wherein the actuator is located remotely from the locking assembly.

21. The apparatus of claim 20, wherein the actuator is coupled to the locking assembly by a flexible line.

22. The apparatus of claim 20, wherein the actuator is adapted to be disposed in a recess located adjacent a top front edge of the hood.

23. The apparatus of claim 18, wherein rotation of the cam results in the pawl moving out of the detent to configure the locking assembly in the released position.

24. The apparatus of claim 18, wherein the locking assembly is adapted to interface with a left hinge and a right hinge used in moving the hood between the open and closed positions to place the left and right hinges in a locked configuration to selectively lock the hood in the open position, wherein the release assembly is adapted to actuate the locking assembly in the release position to substantially simultaneously remove the left and right hinges from the locked configuration to permit the hood to move to the closed position.

* * * * *